United States Patent
Baur et al.

(10) Patent No.: US 8,226,530 B2
(45) Date of Patent: Jul. 24, 2012

(54) METHOD FOR CONTROLLING AN AUTOMATED DUAL CLUTCH TRANSMISSION

(75) Inventors: Peter Baur, Moensheim (DE);
Jan-Peter Hoffmeister, Leonberg (DE);
Jochen Möckl, Knittlingen-Freudenstein (DE)

(73) Assignee: Dr. Ing. H.C. F. Porsche AG, Stuttgart (DE)

( * ) Notice: Subject to any disclaimer, the term of this patent is extended or adjusted under 35 U.S.C. 154(b) by 251 days.

(21) Appl. No.: 12/787,686

(22) Filed: May 26, 2010

(65) Prior Publication Data
US 2011/0003662 A1    Jan. 6, 2011

Related U.S. Application Data

(60) Provisional application No. 61/227,627, filed on Jul. 22, 2009.

(30) Foreign Application Priority Data

Jul. 3, 2009    (DE) .......................... 10 2009 031 629

(51) Int. Cl.
*B60W 10/00* (2006.01)
*F16H 59/00* (2006.01)
(52) U.S. Cl. ............................................. 477/77; 74/335

(58) Field of Classification Search ..................... 477/77, 477/79
See application file for complete search history.

(56) References Cited

U.S. PATENT DOCUMENTS

| | | | |
|---|---|---|---|
| 5,303,794 A | 4/1994 | Hrovat et al. | |
| 6,460,425 B1 * | 10/2002 | Bowen | 74/331 |
| 6,532,841 B2 | 3/2003 | Medico et al. | |

FOREIGN PATENT DOCUMENTS

| | | |
|---|---|---|
| DE | 102 31 518 A1 | 2/2004 |
| DE | 601 02 188 T2 | 2/2005 |
| DE | 10 2005 053 852 A1 | 5/2007 |
| DE | 10 2008 045 627 A1 | 3/2009 |

* cited by examiner

*Primary Examiner* — Dirk Wright
(74) *Attorney, Agent, or Firm* — Leydig, Voit & Mayer, Ltd.

(57) ABSTRACT

A method controls an automated dual clutch transmission of a motor vehicle. An actuating device, preferably arranged in the region of a steering wheel, for selecting the gear step of the shift transmission, which actuating device has a first and a second actuating element which, when actuated individually, cause an upshift or downshift of the shift transmission and, when actuated simultaneously, transfer the shift transmission into an idling state. When both actuating elements are actuated simultaneously, the force-transmitting clutch remains closed and consequently the selected gear remains engaged, and at the same time a clutch torque and/or an engine torque and, consequently, a drive torque acting on a driven wheel is reduced to approximately 0 Nm. It is thereby possible to tie up the force transmission again especially quickly after the termination of the idling state.

7 Claims, 1 Drawing Sheet

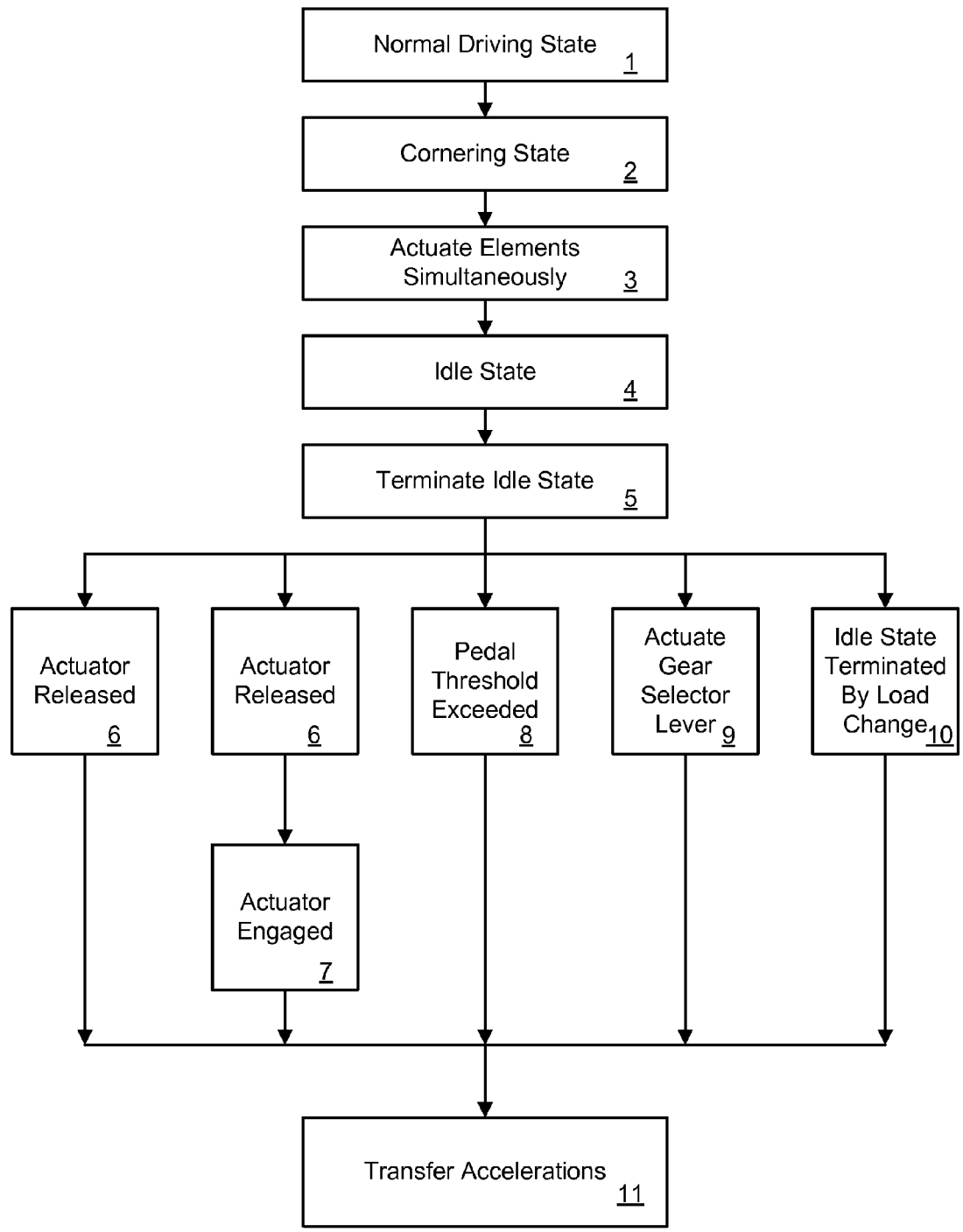

METHOD FOR CONTROLLING AN AUTOMATED DUAL CLUTCH TRANSMISSION

CROSS-REFERENCE TO RELATED APPLICATION

This application claims the priority, under 35 U.S.C. §119 (e), of provisional application No. 61/227,627, filed Jul. 22, 2009; this application also claims the priority, under 35 U.S.C. §119, of German application DE 10 2009 031 629.9, filed Jul. 3, 2009; the prior applications are herewith incorporated by reference in their entirety.

BACKGROUND OF THE INVENTION

Field of the Invention

The present invention relates to a method for controlling an automated dual clutch transmission of a motor vehicle.

When motor vehicles are driving at the slip limit of their tires, for example under high transverse acceleration on bends, the tires have to transmit both very high transverse acceleration forces and drive forces. However, an optimal bend speed can be achieved only when the respective wheel has to absorb transverse acceleration forces only, but not drive forces. Any additional torque on the wheel, in particular also an additional drive torque (traction or overrun) in this case reduces the force transmittable by the tire and thereby increases slip. Consequently, motor vehicles with automatic shift transmissions are already known, in which, particularly on bends with high transverse accelerations, the driver can lower or interrupt a drive torque on the driven vehicle wheels by transferring the automated shift transmission into a neutral position or by opening a clutch.

A similar method for controlling an automatic shift transmission of a motor vehicle is known, for example, from published, non-prosecuted German patent application DE 102 31 518 A1. Here, an actuating device arranged in the region of a steering wheel is provided for selecting an individual gear step of the shift transmission, the actuating device possessing a first and a second actuating element for the upshift or downshift of the shift transmission. When the two actuating elements are actuated simultaneously, the automated shift transmission can be transferred into an idling state, and a drive torque acting on the driven wheels can thereby be reduced to zero.

German utility model DE 601 02 188 T2 discloses a further gear-shifting device of an automatic shift transmission unit with a transmission, the shift transmission unit likewise operating according to the known principle. In this case, the gear-shifting device also has two actuating elements which are arranged in the region of a steering wheel and can be moved in such a way that they transfer the transmission into the idling position and can consequently interrupt a transmission of torque to the driven wheels of the motor vehicle.

The disadvantage of the known prior art, however, is that, in the event of a renewed transmission of torques to the driven wheels, first the transmission has to be adjusted into a force-transmitting position and/or the clutch has to be closed, which, in particular, impedes a rapid transmission of force to the wheels.

SUMMARY OF THE INVENTION

It is accordingly an object of the invention to provide a method for controlling an automated dual clutch transmission which overcomes the above-mentioned disadvantages of the prior art methods of this general type, which, in particular, allows a rapid transmission of force to driven wheels of a motor vehicle after a shift transmission has previously been transferred into an idling state.

The present invention is based on the general idea, in an automated dual clutch transmission of a motor vehicle, to reduce the drive torque on driven wheels of the motor vehicle to preferably zero to allow rapid cornering on bends, but at the same time to leave a previously selected gear engaged and a clutch closed, with the result that renewed force transmission, that is to say renewed torque transmission, to the driven motor vehicle wheels can take place especially quickly. For this purpose, preferably, an actuating device for selecting the gear steps of the shift transmission is arranged in the region of a steering wheel and contains at least one first and one second actuating element. By individual actuation of the two actuating elements, upshift or downshift of the dual clutch transmission takes place here in the usual way, whereas, when the two actuating elements are actuated simultaneously, the dual clutch transmission is transferred into an idling state and, in this, no drive torques are transmitted to the motor vehicle wheels, so that these can be restricted solely to the absorption of transverse acceleration forces and a more rapid and at the same time reliable cornering on bends thereby becomes possible. When the two actuating elements are actuated simultaneously, the force-transmitting clutch of the dual clutch remains closed, and consequently the previously selected gear remains engaged, at the same time a clutch torque and/or an engine torque and, consequently, a drive torque acting on the driven wheels are reduced preferably to zero. In contrast to methods, known from the prior art, for the control of automated shift transmissions, in which a clutch is opened or a previously engaged gear is disengaged, this is not the case in the method according to the invention, and therefore the wish for renewed force transmission or acceleration can be fulfilled markedly more quickly. As a result, in particular, a sports car type of driving is possible, which is not possible because of the time required, in methods and devices known from the prior art, for closing the clutch or for engaging the gear.

In an advantageous development of the solution according to the invention, when at least one of the two actuating elements is released a drive torque is transmitted again to the driven wheels. Thus, in order to leave the state free of drive torque, it is necessary simply to release at least one of the two actuating elements, so that, during rapid cornering, a driver can lower the drive torque preferably to zero in that he actuates the two actuating elements simultaneously, whereas he can cancel this state again by releasing at least one of the two actuating elements. The latter situation may take place, for example, when the vehicle is being driven out of a bend.

In a further advantageous embodiment of the solution according to the invention, in order to terminate the idling state a drive torque is transmitted again to the wheels to be driven when the accelerator pedal is actuated beyond a predefined threshold value. In this case, the driver can terminate the idling state of the shift transmission, advantageous for cornering on a bend, by briefly actuating or touching the accelerator pedal, while, optionally, a predefined threshold value can be stipulated, so that a renewed transmission of torque to the driving wheels then takes place only in so far as this threshold value is overshot, but not in so far as the driver merely touches the accelerator pedal lightly, for example as a result of a muscle spasm. This design variant, too, is conducive to especially sports car type of driving, in which, for the increased absorption of transverse acceleration forces during corning on a bend, the driver first transfers the dual clutch transmission to an idling state and then terminates this, for example, by actuating the accelerator pedal anew, when he is driving out of the bend. The threshold value may in this case be constant or else dependent on other parameters.

Expediently, in the event of a load change from overrun to traction, a drive torque is again transmitted to the driven wheels. When the driver drives into a bend at high speed, it is beneficial that the drive torque to the driven wheels is reduced, preferably reduced to approximately zero, by a simultaneous actuation of the two actuating elements, while, when the driver is driving out of a bend, a drive torque is transmitted again to the wheels to be driven, particularly in so far as a load change from overrun to traction occurs. This makes it possible, in particular, to drive out of the bend in the manner of a sports car, the drive torque to the driven wheels previously having been reduced to an extent such that they can be devoted essentially entirely to the transmission of transverse acceleration forces. To be precise, a maximum bend speed can be achieved exactly when the individual wheels have to transmit transverse acceleration forces only, but at the same time no drive forces act upon the respective wheels. Any additional torque on the driven wheels, such as also an additional drive torque (traction or overrun), would reduce the transverse acceleration forces transmittable by a tire and would increase the slip, as a result of which the forces transmittable by the tires would fall in turn.

In an advantageous alternative embodiment of the solution according to the invention, when a gear selector lever is actuated after the dual clutch transmission has previously been transferred into the idling state, for example as a result of the actuation of the two actuating elements on the steering wheel, a renewed transmission of drive torques to the driven wheels takes place. This allows a renewed transmission of torque to the driving wheels simply as a result of an actuation of the gear selector lever, so that the idling state of the shift transmission can simply be terminated by the respective driver in that he transfers the gear selector lever, for example, from D (drive) to N (neutral) and back again to D. At the same time or alternatively to this, the idling state of the shift transmission can also be terminated after cornering on a bend in that the driver, for example, touches one of the two actuating elements again.

Thus, by the method according to the invention for controlling an automated dual clutch transmission, a rapid force-transmitting torque tie-up to the engine is possible, since both the respective clutch remains closed and a previously selected gear remains engaged. This makes it possible, in particular, to have a markedly improved response behaviour of the motor vehicle in terms of acceleration actions desired after the idling state, as compared with methods known from the prior art, in which the idling state first has to be terminated in that, for example, the clutch has to be closed again or a previously disengaged gear has to be engaged again. All this may be dispensed with in the method according to the invention, since, in this, the idling state required for absorbing increased transverse acceleration forces is achieved solely in that a clutch torque and/or an engine torque and, consequently, a drive torque acting on the driven wheels are reduced to preferably zero, whereas the force-transmitting clutch remains closed and consequently the previously selected gear remains engaged.

Other features which are considered as characteristic for the invention are set forth in the appended claims.

Although the invention is illustrated and described herein as embodied in a method for controlling an automated dual clutch transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing shows one possible method sequence for controlling an automated dual clutch transmission of a motor vehicle according to the invention.

DETAILED DESCRIPTION OF THE INVENTION

Referring now to the single FIGURE of the drawing in detail, there is shown a method sequence for controlling an automated dual clutch transmission of a motor vehicle with different method steps or method states 1 to 11. In state 1, the motor vehicle, not described in any more detail, with a dual clutch transmission is in a normal driving state, in which the driven wheels of the motor vehicle transmit mainly drive torques to a roadway. This corresponds essentially to a straight-ahead drive of the motor vehicle. During cornering, however, the wheels also, in addition to the drive torques, have to absorb transverse acceleration forces or transmit them to the roadway. In method state 2, the motor vehicle is in a cornering state in which the driven wheels have to absorb both longitudinal and transverse accelerations. A maximum cornering speed of the motor vehicle in this case depends directly on the forces to be transmitted by the driven wheels to the roadway, and the maximum cornering speed can usually be achieved only when the wheel driven in each case has to absorb transverse acceleration forces only, but not drive torques in addition.

For this reason, in the motor vehicle, an actuating device is provided which is arranged, for example, in the region of a steering wheel and which likewise has, for example, a first and a second actuating element which, when actuated individually, cause an upshift or downshift of the dual clutch transmission. When the two actuating elements are actuated simultaneously 3, the dual clutch transmission is transferred into an idling state 4, the idling state 4 being characterized, according to the invention, by the following two features. On the one hand, in the idling state 4 of the dual clutch transmission, a force-transmitting clutch of the latter remains closed and, consequently, the previously selected gear remains engaged, and, on the other hand, a clutch torque and/or an engine torque and, consequently, a drive torque acting on a driven wheel are reduced to preferably zero. In the idling state 4, therefore, drive torque is no longer transmitted to the driven wheels, so that these can concentrate entirely and completely on the absorption of transverse acceleration forces.

When cornering is tending to come to an end, it may be desirable even at this stage, for a sports car type of driving, to transmit a renewed drive torque to the driven wheels. This is achieved, according to the invention, in that the idling state 4 is terminated in method step 5, so that, from this method step 5, the driven wheels no longer have to transmit transverse acceleration forces only, but additionally also longitudinal acceleration forces, caused by corresponding drive torques, to the roadway. In this case, alternatively, to terminate the idling state 4 method steps 6 to 10 may be carried out which are explained in detail below:

In method step 6, the idling state 4 is terminated in that at least one of the two actuating elements is released and a drive torque is thereby transmitted once again to the driven motor vehicle wheel. The idling state 4 is in this case therefore maintained only as long as both actuating elements of the actuating device are pressed or pulled.

Alternatively to this, a termination of the idling state 4 may also take place in that at least one of the two actuating elements is released, this corresponding to method step 6, and subsequently at least one of the two actuating elements is actuated, that is to say pressed or pulled, anew in method step 7.

In method step 8, the idling state 4 according to the invention is terminated in that the driver actuates an accelerator pedal of the motor vehicle beyond a predefined threshold value. The threshold value in this case has the object of preventing the idling state 4 from being terminated even when the driver merely touches the accelerator pedal lightly and has not wanted to terminate the idling state 4 at all.

In method step 9, the idling state 4 can be terminated in that the driver of the motor vehicle actuates a gear selector lever and a drive torque is thereby transmitted to the driven motor vehicle wheel again. Here, of course, a predefined threshold value may be provided in a similar way to termination by touching the accelerator pedal.

In method step 10, as a last alternative to terminating the idling state 4, a termination of the idling state 4 can take place automatically by a load change from overrun to traction. Such a load change may be determined, for example, by a corresponding sensor in the dual clutch transmission. In general, in this case, method steps 6 to 10 constitute substeps to method step 5 which has an overriding action for terminating the idling state 4.

In method state 11, which corresponds essentially to method state 1, longitudinal and transverse accelerations can then be transferred to the roadway once again by the driven wheel of the motor vehicle.

The invention claimed is:

1. A method for controlling an automated dual clutch transmission of a motor vehicle having an actuating device for selecting a gear step of the automated dual clutch transmission, the actuating device having a first and a second actuating element, which comprises the steps of:
   actuating one of the first and second actuating elements individually, causing one of an upshift and a downshift of the automated dual clutch transmission; and
   actuating the first and second actuating elements simultaneously for transferring the automated dual clutch transmission into an idling state, and, when both of the first and second actuating elements are actuated simultaneously, a force-transmitting clutch remains closed and consequently a selected gear remains engaged, and at a same time at least one of a clutch torque and an engine torque and, consequently, a drive torque acting on a driven wheel being reduced to approximately 0 Nm.

2. The method according to claim 1, which further comprises terminating the idling state by releasing at least one of the first and second actuating elements resulting in a drive torque being transmitted to the wheel again.

3. The method according to claim 1, which further comprises terminating the idling state by a release and a renewed actuation of at least one of the first and second actuating elements and a drive torque is thereby transmitted to the wheel again.

4. The method according to claim 1, which further comprises terminating the idling state by actuating the gear selector lever resulting in a dive torque thereby being transmitted to the wheel again.

5. The method according to claim 1, which further comprises terminating the idling state by actuating an accelerator pedal beyond a predefined threshold value resulting in a dive torque thereby being transmitted to the wheel again.

6. The method according to claim 1, which further comprises terminating the idling state by means of a load change from overrun to traction resulting in a dive torque thereby being transmitted to the wheel again.

7. The method according to claim 1, which further comprises providing the actuating device in a region of a steering wheel.

* * * * *